US010394215B2

(12) United States Patent
Li et al.

(10) Patent No.: US 10,394,215 B2
(45) Date of Patent: Aug. 27, 2019

(54) CONTROL METHOD AND APPARATUS FOR QUICK CHANGE DEVICE OF WORK TOOLS

(71) Applicant: Caterpillar Inc., Peoria, IL (US)

(72) Inventors: Liang Li, Wuxi (CN); Mingsheng Xiao, Wuxi (CN); Zhen Li, Wuxi (CN); Thuong Le, Wuxi (CN)

(73) Assignee: Caterpillar Inc., Deerfield, IL (US)

( * ) Notice: Subject to any disclaimer, the term of this patent is extended or adjusted under 35 U.S.C. 154(b) by 253 days.

(21) Appl. No.: 15/479,721

(22) Filed: Apr. 5, 2017

(65) Prior Publication Data
US 2017/0293283 A1 Oct. 12, 2017

(30) Foreign Application Priority Data
Apr. 7, 2016 (CN) .......................... 2016 1 0212954

(51) Int. Cl.
E02F 9/24 (2006.01)
G05B 19/18 (2006.01)
A01B 76/00 (2006.01)
B23Q 11/00 (2006.01)
F16P 3/00 (2006.01)

(52) U.S. Cl.
CPC ............ G05B 19/182 (2013.01); A01B 76/00 (2013.01); B23Q 11/0085 (2013.01); E02F 9/24 (2013.01); F16P 3/00 (2013.01); G05B 2219/50245 (2013.01)

(58) Field of Classification Search
CPC .. A01B 76/00; G05B 19/182; B23Q 11/0085; F16P 3/00; E02F 3/841; E02F 3/434; E02F 9/205; E02F 9/262; E02F 3/7622; E02F 9/26; E02F 9/264; E02F 9/265; E02F 3/3618; E02F 9/226; E02F 9/24; E02F 3/3627; E02F 3/364; E02F 3/3663; E02F 9/2292; B66F 9/0655
USPC ......... 37/348, 468, 411, 386, 189, 450, 413; 172/2–11; 701/50; 700/17, 175, 177, 700/180, 192, 190, 195, 275, 302; 702/9, 702/29, 50; 60/486; 91/165, 166, 419, 91/420, 442; 414/723
See application file for complete search history.

(56) References Cited

U.S. PATENT DOCUMENTS 6,266,960 B1 * 7/2001 Bibb ..................... E02F 3/3627
60/486
6,990,390 B2 * 1/2006 Groth ..................... E02F 3/435
37/413

(Continued)

FOREIGN PATENT DOCUMENTS

CN 104727361 A 6/2015
CN 104981571 A 10/2015

Primary Examiner — Robert E Pezzuto
(74) Attorney, Agent, or Firm — Steven G. Kibby; Hibshman Claim Construction PLLC

(57) ABSTRACT

The invention relates to a control method for a quick change device of a work tool, comprising the steps of: receiving a command to disengage a work tool clamping device; determining whether the work tool clamping device is in an engaged state; detecting functionality of a disengagement alarm if the work tool is in the engaged state; switching to an emergency state upon the detection of failure of the disengagement alarm. The present invention further relates to a corresponding control apparatus and work machine.

8 Claims, 4 Drawing Sheets

(56) References Cited

U.S. PATENT DOCUMENTS 7,367,256 B2 * 5/2008 Fatemi .................... E02F 3/365
                                                    91/1
9,938,688 B2 * 4/2018 Fletcher ................. E02F 3/841

* cited by examiner

CONTROL METHOD AND APPARATUS FOR QUICK CHANGE DEVICE OF WORK TOOLS

TECHNICAL FIELD

The invention relates to a control method and a control apparatus for a quick change device of a work tool.

BACKGROUND ART

The mechanical machines, e.g. engineering machines or agriculture machines in the art are designed to perform various tasks, wherein different work tools are mounted by unified or standard work tool clamping devices. For these multi-functionality machines, usually corresponding work tools have to be changed during switching among different tasks. For this, a corresponding quick change device of a work tool is provided.

Generally speaking, current quick change device of a work tool is equipped with an alarming horn, which sounds when a work tool clamping device is in a disengaged position. The alarming horn is used to remind an operator of the fact that the work tool clamping device is in the disengaged position and that the work tool is not connected or fastened. However, if the alarming horn fails to work due to failure of an electric circuit thereof, the operator will not be informed that the work tool clamping device is in the disengaged position. In this case, the operator may perform the operation when the work tool clamping device is not engaged or the work tool is not fastened, because he/she is not aware of the fact that the work tool clamping device in the disengaged position. The work tool therefore may come loose and fall down, even resulting in safety accident.

SUMMARY OF THE INVENTION

Based on the prior art, the present invention is directed provide a control method and a control apparatus for a quick change device of a work tool, so as to improve safety of the quick change device of the work tool.

In the present invention, a control method for a quick change device of a work tool is provided, comprising the steps of:
  receiving a command to disengage a work tool clamping device;
  determining whether the work tool clamping device is in an engaged state;
  detecting functionality of a disengagement alarm if the work tool clamping device is in the engaged state;
  switching to an emergency state upon detection of failure of the disengagement alarm.

This method enables an emergency state, so that accident can be avoided in the failure of the alarm.

The present invention further relates to a control apparatus for carrying out the control method according to the present invention.

DETAILED DESCRIPTION OF THE EMBODIMENTS

Figure 1:
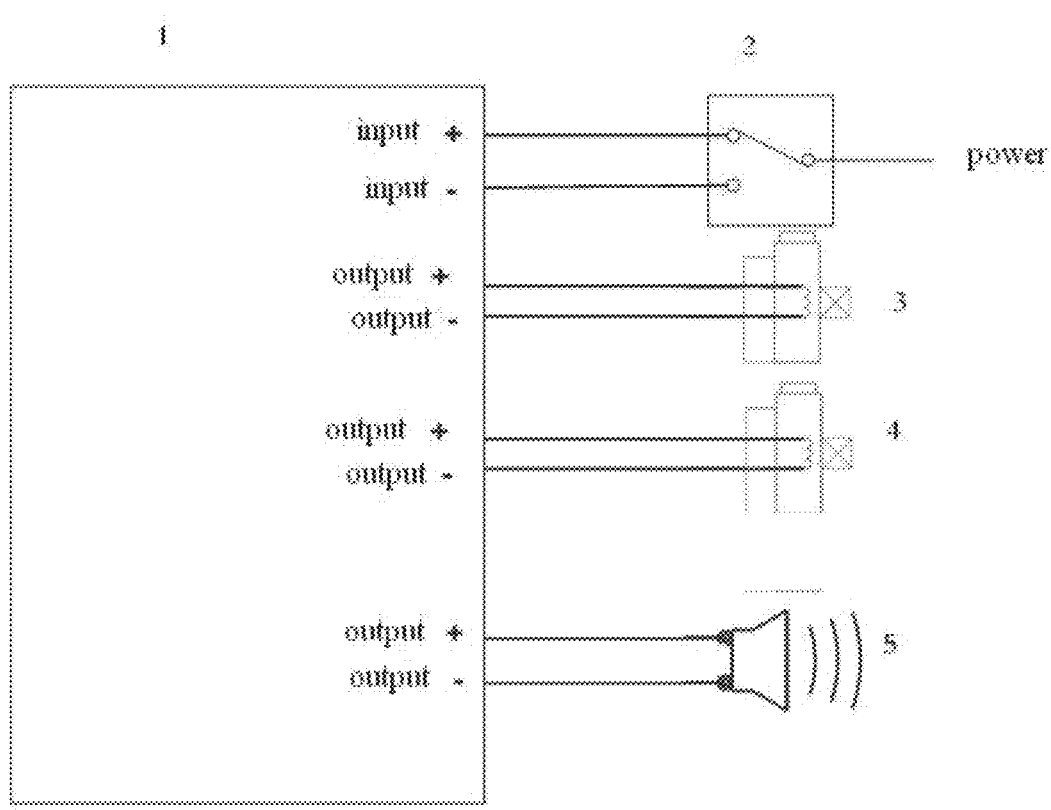
FIG. 1 is a schematic view of an embodiment of the control apparatus for a quick change device of a work tool according to the present invention.

FIG. 1 is a schematic view of the control apparatus of the present invention. The control apparatus controls a quick change device of a work tool, which includes a work tool clamping device for clamping and maintaining the work tool in a working state.

The control apparatus comprises an electronic control unit 1. A quick change operation member 2 is provided for the quick change device and is controlled by a user, such as but not limited to a switch or a button. The signal of the quick change operation member is transmitted to the electronic control unit 1, which generates multiple control signals based on the signal received from the quick change operation member 2.

A first control signal is transmitted to an engaging means 3 for the work tool clamping device, wherein the engaging means engages the work tool clamping device so that the work tool is fastened on the machine and hence in a working state. The engaging means 3 for the work tool clamping device for example may be an electromagnetic valve in a hydraulic line for controlling the work tool clamping device.

A second control signal is transmitted to a disengaging means 4 for the work tool clamping device, wherein the disengaging means disengages the work tool clamping device so that the work tool is released and in a changeable state. The disengaging means 4 for the work tool clamping device for example may also be an electromagnetic valve in a hydraulic line for controlling the work tool clamping device.

Figure 2:
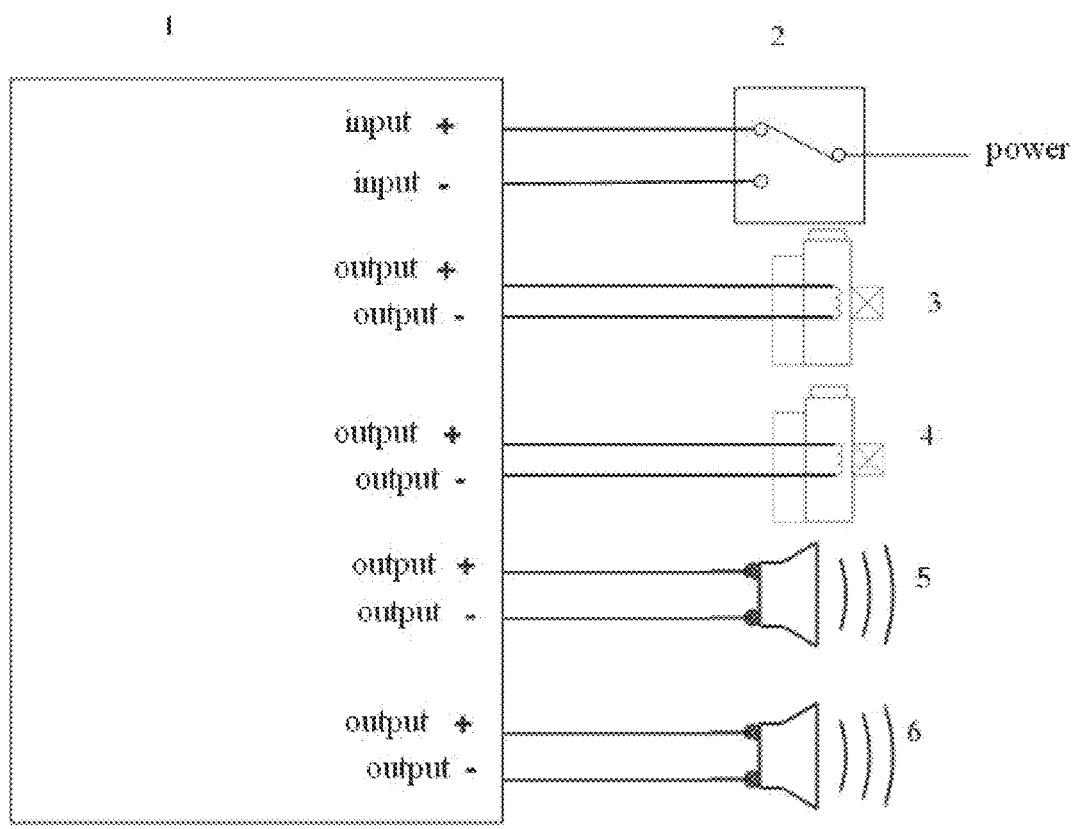
FIG. 2 is a schematic view of another embodiment of the control apparatus for a quick change device of a work tool according to the present invention.

A third control signal is transmitted into a disengagement alarm 5, which is activated in a disengaged and changeable state of the work tool. Generally, the disengagement alarm 5 may be an alarm horn, or of course may be an optical alarm or other types of alarm. According to another embodiment of the invention, a further alarming device (see FIG. 2) may be provided to inform an operator that the disengagement alarm 5 fails or malfunctions.

Generally, if the signal from the quick change operation member 2 is "ON", the electronic control unit activates disengaging means 4 for the work tool clamping device and the disengagement alarm 5 at the same time, so that a work tool quick change procedure is accompanied by continuous alarming. Generally, the work tool clamping device is disengaged, and then the current work tool is replaced by a work tool to be used, and finally the work tool clamping device is engaged again to fasten the new work tool.

If the signal from the quick change operation member 2 is "OFF", the electronic control unit activates the engaging means 3 for the work tool clamping device, so that the work tool clamping device is kept in an engaged state.

Figure 3:
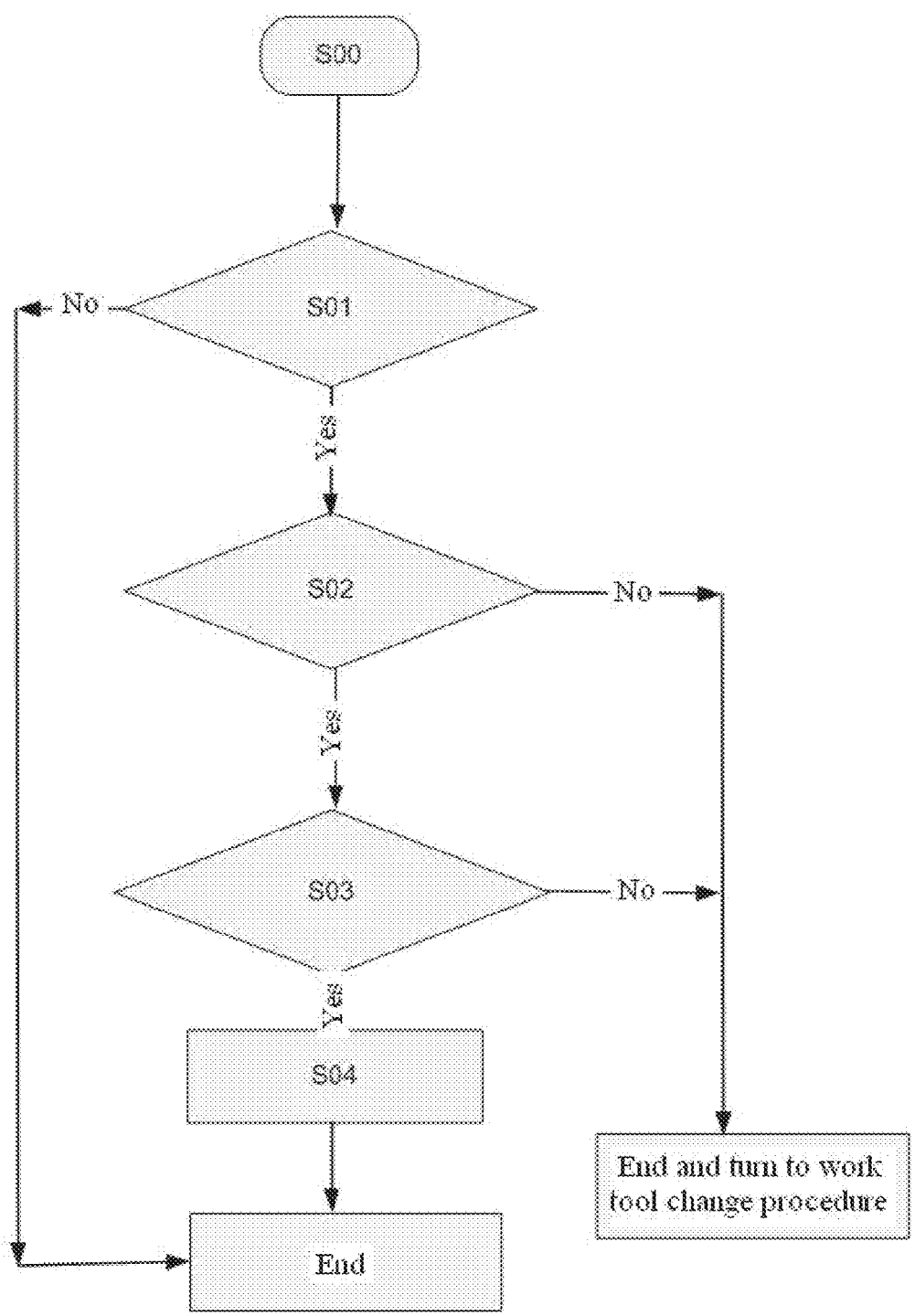
FIG. 3 is a flow chat of an embodiment of the control method for the quick change device of the work tool according to the present invention.

FIG. 3 is a flow chat of an embodiment of the control method for quick change device of a work tool according to the present invention. In step S00 the method is started and turned to step S01, in which the electronic control unit 1 detects the signal from the quick change operation member 2, i.e. receives a command to disengage the work tool clamping device and determines whether the user wants to change the work tool.

The method is terminated if the determination in step S01 is negative, i.e. the quick change operation member 2 is "OFF". If the determination in step S01 is positive, i.e. the quick change operation member 2 is switched "ON", step S02 starts.

In step S02, it is determined whether the work tool clamping device is in an engaged state. If the determination is negative in step S02, i.e. the work tool clamping device is already disengaged, the method is terminated and turned to a further work tool change procedure. If the determination is positive in step S02, i.e. the work tool clamping device is in an engaged state, step S03 starts.

In step S03 it is determined whether the disengagement alarm functions properly. The detection of the functionality of the disengagement alarm includes detection of a short circuit to the grounding and/or a short circuit to the power and/or an open circuit for the disengagement alarm.

If the determination in step S03 is positive, i.e. the disengagement alarm well functions, the method is terminated and a further work tool change procedure is started. If the determination of Step S03 is negative, i.e. the disengagement alarm fails, step S04 is started.

In step S04, the work tool clamping device is prevented from being disengaged by the electronic control unit 1, so that the work tool can not be changed by operating the quick change device. The engaging means 3 for the work tool clamping device is kept in an engaged state and/or disengaging means 4 for the work tool clamping device is deactivated. The method is then terminated.

In this way, a so-called "emergency state" is initiated at the failure of the disengagement alarm, so that the work tool clamping device is kept in an engaged state and hence danger caused by disengagement of the work tool clamping device is avoided and the safety performance of the apparatus is improved.

Depending on the configuration of the work tool clamping device, "preventing the work tool clamping device from being disengaged" may include any control means, for example hydraulically or electromechanically, acting on the control line of the work tool clamping device. In particular, said control means may include controlling the engaging means 3 for the work tool clamping device and/or the disengaging means 4 for the work tool clamping device.

Figure 4:
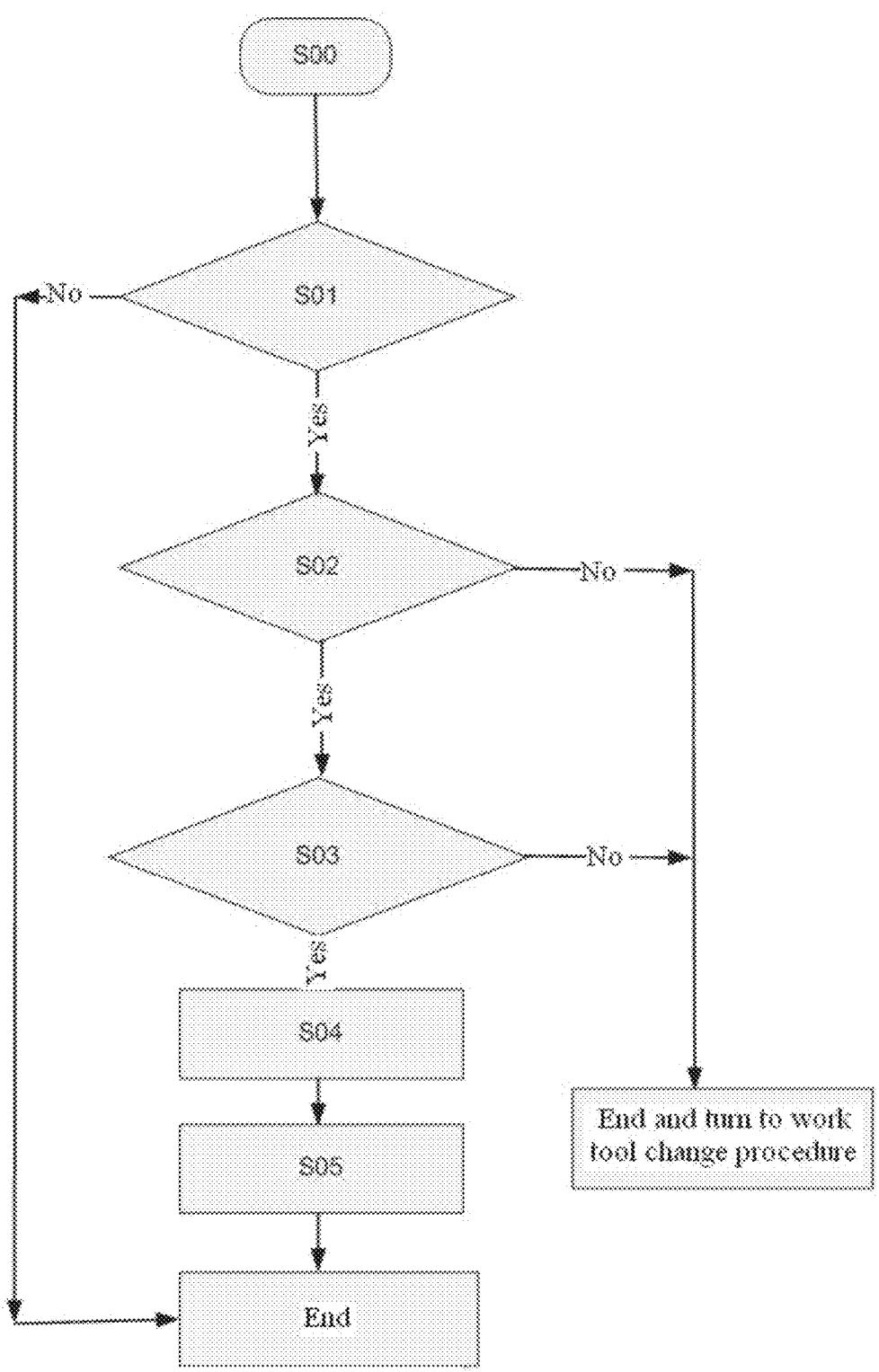
FIG. 4 is a flow chat of another embodiment of the control method for the quick change device of the work tool according to the present invention.

FIG. 4 shows a flow chat of another embodiment of the control method for the quick change device of the work tool according to the present invention. This embodiment is different from the embodiment of FIG. 3 only in the presence of step S05, in which the operator is warned of the failure of the disengagement alarm.

The present invention further includes such technical solutions, in which only a warning is triggered to inform the operator of the failure of the disengagement alarm while the step of "preventing the work tool clamping device from being disengaged" is not carried out.

To sum up, the so-called "emergency state" is activated by preventing the work tool clamping device from being disengaged or by triggering an alarm at the failure of the disengagement alarm, so that danger caused by accidental disengagement of the work tool can be avoided.

The invention claimed is:

1. A control method for a quick change device of a work tool, the control method comprising the steps of:
   receiving a command to disengage a work tool clamping device;
   determining whether the work tool clamping device is in an engaged state;
   detecting a functionality of a disengagement alarm if the work tool clamping device is in the engaged state; and
   switching to an emergency state upon detection of a failure of the disengagement alarm.

2. The control method according to claim 1, wherein the work tool clamping device is prevented from being disengaged in the emergency state.

3. The control method according to claim 2, wherein preventing the work tool clamping device from being disengaged in the emergency state includes at least one of
   keeping an engaging means for the work tool clamping device engaged, and
   disabling a disengaging means for the work tool clamping device.

4. The control method according to claim 1, wherein in the emergency state an operator is warned of the failure of the disengagement alarm.

5. The control method according to claim 1, wherein the detecting of the functionality of the disengagement alarm includes detection of at least one of a short circuit to a grounding, a short circuit to a power, and an open circuit for the disengagement alarm.

6. The control method according to claim 1, wherein the command to disengage the work tool clamping device is triggered by an operation of a work tool quick change operation member from an operator.

7. A control apparatus for a quick change device of a work tool, the control apparatus comprising:
   an electronic control unit;
   an operation member controllable by an operator, a signal from the operation member being transmitted to the electronic control unit;
   an engaging means for a work tool clamping device, a first control signal from the electronic control unit being transmitted to the engaging means;
   a disengaging means for the work tool clamping device, a second control signal from the electronic control unit being transmitted to the disengaging means; and
   a disengagement alarm, a third control signal from the electronic control unit being transmitted to the disengagement alarm,
   wherein the control apparatus carries out the control method of claim 1.

8. A work machine comprising the control apparatus of claim 7.

* * * * *